United States Patent [19]
Oka

[11] Patent Number: 5,388,113
[45] Date of Patent: Feb. 7, 1995

[54] LASER GENERATING APPARATUS
[75] Inventor: Michio Oka, Kanagawa, Japan
[73] Assignee: Sony Corporation, Tokyo, Japan
[21] Appl. No.: 186,753
[22] Filed: Jan. 26, 1994
[30] Foreign Application Priority Data Jan. 27, 1993 [JP] Japan .................................. 5-011292

[51] Int. Cl.[6] .................................................. H01S 3/10
[52] U.S. Cl. ...................................... 372/21; 372/22; 372/29; 372/92; 372/94; 372/102; 372/103
[58] Field of Search ...................... 372/21, 22, 29, 92, 372/94, 102, 103

[56] References Cited

U.S. PATENT DOCUMENTS

| | | | |
|---|---|---|---|
| 5,017,806 | 5/1991 | Edelstein et al. | 359/328 |
| 5,206,868 | 4/1993 | Deacon | 372/21 |
| 5,249,193 | 9/1993 | Watanabe | 372/22 |
| 5,253,102 | 10/1993 | Okazaki | 372/22 |
| 5,268,913 | 12/1993 | Sakowski et al. | 372/22 |
| 5,297,156 | 3/1994 | Deacon | 372/21 |

FOREIGN PATENT DOCUMENTS 0395451 10/1990 European Pat. Off. .

OTHER PUBLICATIONS

*Applied Physics Letters*, W. P. Risk et al., "Diode Laser pumped blue-light source based on intracavity sum frequency generation", 27 Feb. 1989, vol. 54, No. 9, pp. 789-791.
*Applied Optics*, E. Liu et al., "Intracavity sum frequency mixing as a source of tunable cw uv radiation", Oct. 1982, vol. 21, No. 19, pp. 3415-3416.
*Optics Letters*, B. Couillaud et al., "Generation of continuous-wave ultraviolet radiation by sum-frequency mixing in an extenal ring cavity", Jun. 1982, vol. 7, No. 6, pp. 265-267.
*Optics Letters*, H. Hemmati et al., "Generation of continuous-wave 194 nm radiation by sum-frequency mixing in an external ring cavity", Feb. 1983, vol. 8, No. 2, pp. 73-75.

*Primary Examiner*—James W. Davie
*Attorney, Agent, or Firm*—Hill, Steadman & Simpson

[57] ABSTRACT

A sum frequency conversion efficiency can be improved and operation can be stabilized. A laser generating apparatus comprises a nonlinear optical element (3) for generating a sum frequency light having wavelengths of first and second fundamental wave laser lights having first and second wavelengths ($\lambda 1$) and ($\lambda 2$) by introducing the above first and second fundamental wave laser lights thereto, and a resonator (7) having a first fundamental wave light source (1) and the nonlinear optical element (3) incorporated therein. The resonator (7) includes at least first and second reflection mirrors (M1) and (M2) disposed on opposing entrance and exit end faces of the nonlinear optical element (3) in an opposing relation. These first and second reflection mirrors (M1) and (M2) having transmissivities as high as possible relative to the second fundamental wave laser light and a sum frequency light. The first and second reflection mirrors (M1) and (M2) have reflectivities as high as possible relative to the first fundamental wave laser light, and incident axes of the first and second fundamental wave laser lights relative to these mirror surfaces are selected to be held on oblique directions which are not coincident with perpendicular lines of these mirror surfaces.

18 Claims, 11 Drawing Sheets

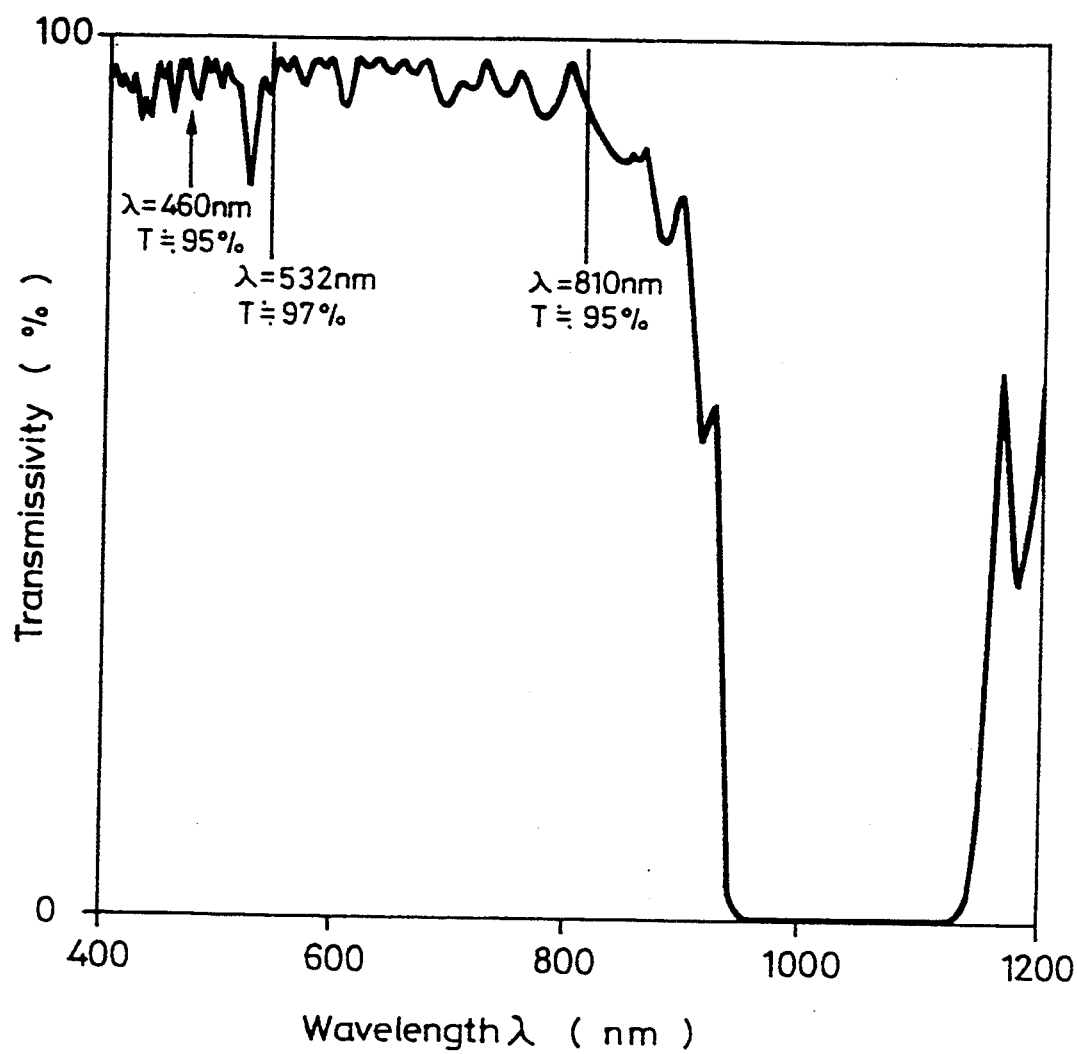

LASER GENERATING APPARATUS

BACKGROUND OF THE INVENTION

1. Field of the Invention

The present invention relates to a laser generating apparatus and, more particularly, is directed to a laser generating apparatus of an SFG (Sum Frequency generation) type which generates a sum frequency of fundamental wave laser lights of first and second wavelengths by introducing these fundamental wave laser lights into a nonlinear optical device.

2. Description of the Prior Art

FIG. 1 of the accompanying drawings shows an example of a conventional laser generating apparatus of an SFG type which generates a sum frequency of laser lights having different wavelengths $\lambda 1$ and $\lambda 2$ emitted from first and second fundamental wave light sources 1 and 2 (see Applied Physics Letters, Vol. 52, p. 85, 1988 and Applied physics Letters, Vol. 54, p. 789, 1988).

This conventional laser generating apparatus of SFG type will be described below with reference to FIG. 1. As shown in FIG. 1, a nonlinear optical device 3 made of KTiOPO4 (KTP) for generating a sum frequency is provided within a laser resonator formed of mirrors 4M1 and 4M2 of a first fundamental wave light source 1.

The first fundamental wave light source 1 is an Nd:YAG laser excited by an excitation laser 5, for example, and a second fundamental wave light source 2 is a GaAlAs semiconductor laser. A laser light from the excitation laser 5 and a laser light from the second fundamental wave light source 2 are introduced through a polarization beam splitter (PBS) 6 into a resonator. A first fundamental wave based on the laser light having the first wavelength $\lambda 1$ from the Nd:YAG laser excited by the excitation laser light and a second fundamental wave based on the laser light having the second wavelength $\lambda 2$ from the fundamental wave light source 2 are introduced into the nonlinear optical device 3, in which the first and second fundamental waves are matched in phase in a type 2 fashion.

More specifically, when the first and second fundamental waves are introduced such that respective polarizing planes of the laser lights from the two fundamental wave light sources 1 and 2 are extended along a b-axis of a KTP crystal of the nonlinear optical device 3 and become coincident with an a-axis and a c-axis of the KTP crystal, this laser generating apparatus generates a blue coherent light beam having a short wavelength of $\lambda SFG = 459$ nm during the process for generating a sum frequency if $\lambda 1 = 1064$ nm and $\lambda 2 = 809$ nm on the basis of a relationship expressed as:

$$1/\lambda SFG = 1/\lambda 1 + 1/\lambda 2 \qquad (1)$$

This laser light source apparatus of SFG type can modulate at a high speed GaAlAs laser that is used as the second fundamental wave light source. Therefore, it is expected that the laser light source apparatus of SFG type is suitably applied to a light source for optical memories because a sum frequency light can be modulated at a high speed by modulating the GaAlAs laser.

The conventional laser generating apparatus arranged as shown in FIG. 1, however, encounters problems, such as an insufficient conversion efficiency, an unstable output or the like.

SUMMARY OF THE INVENTION

It is therefore an object of the present invention to provide a laser generating apparatus of SFG type which can improve a conversion efficiency and which can generate a stable output.

According to a first aspect of the present invention, as shown in FIG. 2 which is a diagram showing a structure of a laser generating apparatus of the present invention, there is provided a laser generating apparatus which comprises a first fundamental wave light source 1 for generating a first fundamental wave laser light having a first wavelength $\lambda 1$, a second fundamental wave light source 2 for generating a second fundamental wave laser light having a second wavelength $\lambda 2$ different from the first wavelength $\lambda 1$, a nonlinear optical device 3 of type 2 for generating a sum frequency (wavelength $= \lambda SFG$) based on the wavelengths (above-mentioned equation (1)) of the two fundamental wave laser lights by introducing the first and second fundamental wave laser lights, and a resonator 7 having disposed therein a laser medium 1s of the first fundamental wave light source 1 and the nonlinear optical device 3.

The resonator 7 comprises first and second reflection mirrors M1, M2 disposed on opposing light entrance and exit end faces of at least the nonlinear optical device 3 in an opposing fashion.

The first and second reflection mirrors M1, M2 have a transmissivity as high as possible for the second fundamental wave laser light and the sum frequency light and also have a reflectivity as high as possible for the first fundamental wave laser light.

Optical axes through which the first and second fundamental wave laser lights become incident on the mirror surfaces of the first and second reflection mirrors M1 and M2 are selected to in the oblique direction in which the above optical axes are held at predetermined angles that are not coincident with perpendicular lines of these mirror surfaces.

According to a second aspect of the present invention, as shown in FIGS. 3A and 3B which show structures of the present invention, a laser generating apparatus comprises a first fundamental wave light source 1 for generating a first fundamental wave laser light having a first wavelength $\lambda 1$, a second fundamental wave light source 2 for generating a second fundamental wave laser light having a second wavelength $\lambda 2$, a nonlinear optical device 3 for generating a sum frequency (wavelength $= \lambda$ SFG) based on the above-mentioned equation (1) of the wavelengths of the two fundamental wave laser lights by introducing the first and second fundamental wave laser lights, and a resonator 7 having the nonlinear optical device 3 disposed therein.

Also in this case, the resonator 7 includes first and second reflection mirrors M1, M2 disposed on opposing light entrance and exit end faces of at least the nonlinear optical device 3 in an opposing fashion. The first and second reflection mirrors M1, M2 have a transmissivity as high as possible for the second fundamental wave laser light and the sum frequency light and also have a reflectivity as high as possible for the first fundamental wave laser light.

Also, in this case, optical axes through which the first and second fundamental wave laser lights become incident on the mirror surfaces of the first and second reflection mirrors M1, M2 are selected to be in the oblique direction in which the above optical axes are held at predetermined angles that are not coincident with perpendicular lines of the above mirror surfaces.

According to the present invention, in the structures of the first and second aspects, the resonator 7 is comprised of two pairs of reflection mirrors or more, i.e., first to fourth reflection mirrors M1 to M4 so that their optical paths are of a folded arrangement.

Further, according to the present invention, in the structures of the first and second aspects, optical axes of the first and second fundamental wave laser lights introduced into the nonlinear optical device 3 are selected to be in the oblique direction in which these optical axes are held at predetermined angles that are not coincident with the perpendicular lines of the light entrance and exit end faces of the nonlinear optical device 3, i.e., 2° to 3° relative to these perpendicular lines According to the present invention, the incident angles of the first and second fundamental wave laser lights introduced into the nonlinear optical device 3 are selected so as to satisfy Brewster's condition relative to the nonlinear optical device 3.

Further, according to the present invention, into the optical path within the resonator 7 in which the second fundamental wave laser light passed the nonlinear optical device 3, there is inserted an optical device 14 for absorbing or reflecting the second fundamental wave laser light to the outside of the above optical path, such as a filter, Brewster polarizer or the like.

Further, according to the present invention, there is provided a shielding member 8 which shields reflected lights from the above entrance and exit end faces of the nonlinear optical device 3, the reflection mirror surfaces of the resonator 7 or the like.

Further, according to the present invention, there is provided a shield plate member 9 for shielding the first fundamental wave light source 1 which excites a high-order spatial mode of the first fundamental wave light source 1 from reflected and scattered lights generated on the surface of the component parts provided within the resonator 7, the inner scattering or the like.

Further, according to the present invention, the second fundamental wave laser light source 2 is formed of a semiconductor laser, and a wavelength selecting device 10 is provided ahead of or behind this semiconductor laser. An output of the sum frequency light from the nonlinear optical device 3 is modulated by modulating an intensity of the generated output having the second wavelength by introducing a light having a selected wavelength from the wavelength selecting device 10 into the semiconductor laser of the second fundamental wave light source 2.

Furthermore, according to the present invention, the above-mentioned wavelength selecting device 10 is formed of a diffraction grating.

Describing elementally, according to the above-mentioned structure of the present invention, the first and second fundamental wave laser lights relative to the mirror surfaces of the reflection mirrors M1, M2 disposed across the nonlinear optical device 3 are introduced into the mirror surfaces such that their optical axes become oblique to the perpendicular lines of these mirror surfaces. Thus, when the fundamental wave light source, e.g., the second fundamental wave light source 2 is formed of the semiconductor laser, the reflected-back light to the second fundamental wave light source 2 can be reduced effectively.

This reflected-back light has a so-called residual reflectivity of several percents in actual practice even though the two reflection mirrors M1, M2 are arranged to have the mirror surfaces which present high transmissivity relative to the laser light of the second fundamental wave light source 2, i.e., transmissivity of substantially 100%. There is then the problem of the reflected-back lights from these mirrors M1, M2 to the second fundamental wave light source 2. Therefore, when the second fundamental wave light source 2 is formed of the semiconductor laser, there occur a noise due to a mode hopping or the like and a wavelength fluctuation of about several nanometers, for example. As a result, the conversion efficiency of the nonlinear optical device 3 is lowered, accordingly, the sum frequency output is lowered, and further the output of the nonlinear optical device 3 becomes unstable. According to the structures of the present invention, since the reflected-back light can be reduced effectively, the conversion efficiency of the nonlinear optical device 3 can be improved and the sum frequency output can be improved and stabilized.

Since the resonator 7 is of the folded arrangement, the spot size of the first fundamental wave laser light focused on the end face of the nonlinear optical device 3 can be sufficiently reduced by selecting the position, shape of the mirrors or the like, which can improve the conversion efficiency in the nonlinear optical device 3.

Further, the optical axes of the first and second fundamental wave laser lights introduced into the nonlinear optical device 3 are selected to be in the oblique direction in which the above optical axes are held at the predetermined angles which are not coincident with the perpendicular lines of the entrance and exit end faces of the nonlinear optical device 3, whereby the reflected lights traveling from these faces to the semiconductor laser, i.e., reflected-back lights can be reduced much more. Therefore, because of the reasons similar to those described above, the conversion efficiency of the nonlinear optical device 3 can be improved, i.e., the sum frequency output can be improved. Further, the sum frequency output can be stabilized.

In this case, although the optical axes of the laser lights are inclined relative to the perpendicular lines of the entrance and exit end faces of the nonlinear optical device 3, it is sufficient that this inclination may be about 2° to 3°. Therefore, even though the polarized planes of the laser lights are inclined by such angle from the directions along the b axis to the a axis and c axis, i.e., a-b plane and c-b plane, there is then no problem that the conversion efficiency is lowered thereby.

Further, since the optical device 14 for absorbing or reflecting the second fundamental wave laser light to the outside of the optical path is provided in the optical path within the resonator in which the second fundamental wave laser light passed the nonlinear optical device 3, when the semiconductor laser is used as the second fundamental wave light source 2, the reflected-back light can be reduced and the occurrence of noise can be avoided. Thus, there can be obtained a stable sum frequency output.

Further, there is provided the shield member 8 for shielding the second fundamental wave light source 2 from the reflected lights from the entrance and exit end faces of the nonlinear optical device 3 and from the reflection mirror surfaces of the resonator 7 or the like. Also, there is provided the shielding plate member 9 for shielding the first fundamental wave light source 1 which excites the high-order spatial mode of the first fundamental wave light source 1 reflected and scattered lights generated from the surfaces of the component parts within the resonator 7 and the inner scattering or the like. Therefore, as will become clear from the explanation of preferred embodiments of the present invention later on, the sum frequency output can be stabilized much more.

Furthermore, according to the laser generating apparatus of the present invention, since the reflected-back lights generated due to the residual reflection on respective parts can be improved, the laser generating apparatus can be operated stably and the conversion efficiency of the sum frequency output can be improved. In addition, since the spot size of the first fundamental wave laser light on the nonlinear optical device 3 can be reduced. There are then achieved important practical advantages that the conversion efficiency can be improved much more.

BRIEF DESCRIPTION OF THE DRAWINGS

FIG. 4 is a transmissivity characteristic plot.

DETAILED DESCRIPTION OF THE PREFERRED EMBODIMENTS

Embodiments of the present invention will hereinafter be described with reference to the drawings.

A laser generating apparatus according to a first embodiment of the present invention will be described below with reference to FIG. 2.

Figure 2:
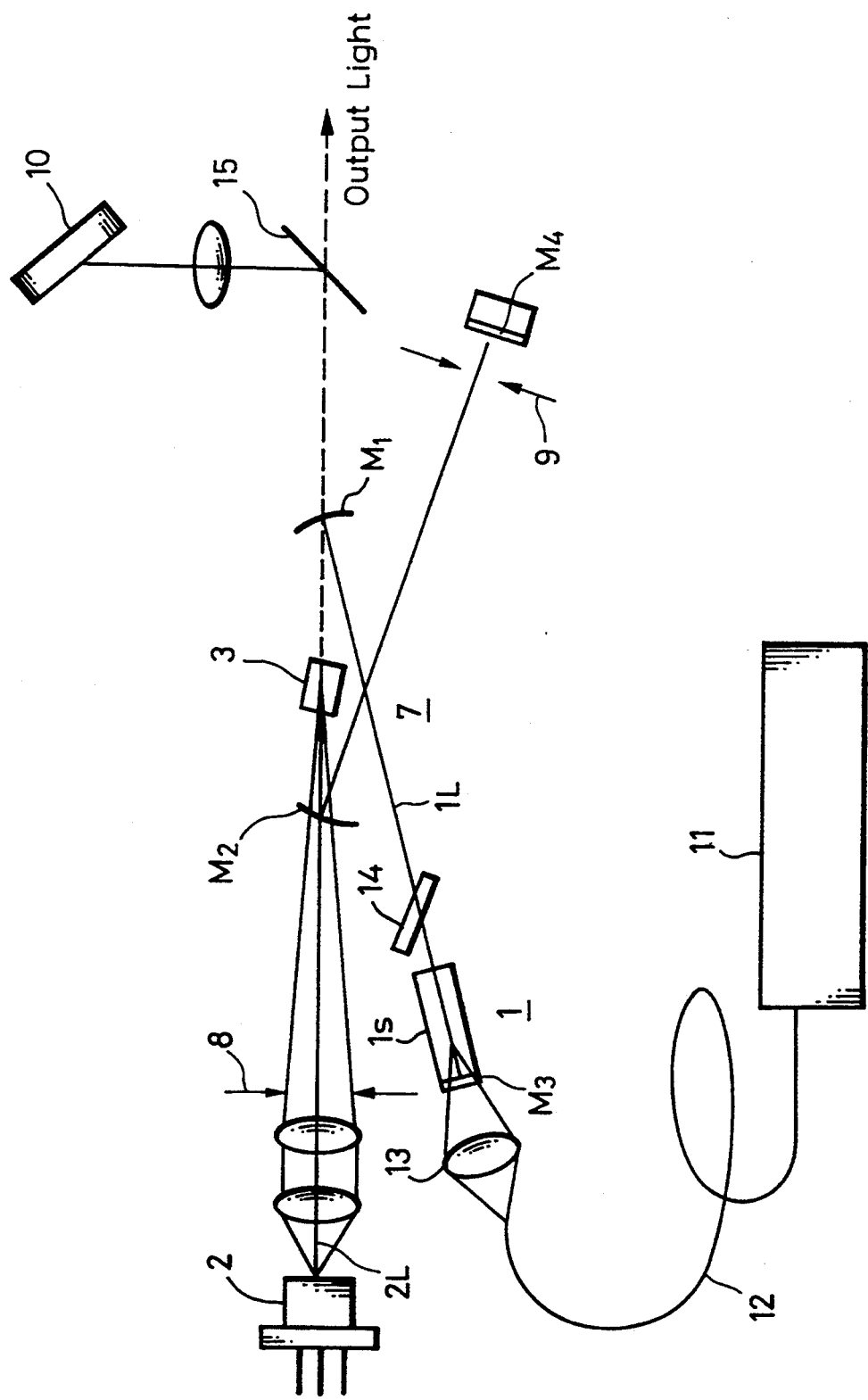
FIG. 2 is a schematic diagram showing a structure of an example of an internal resonator used in a laser generating apparatus according to the present invention.

As shown in FIG. 2, there are provided a first fundamental wave light source 1 which generates a first fundamental wave laser light 1L having a wavelength $\lambda 1$, a second fundamental wave light source 2 which generates a second fundamental wave laser light 2L having a wavelength $\lambda 2$ different from the wavelength $\lambda 1$, a nonlinear optical device 3 which generates a sum frequency light (wavelength=$\lambda$SFG) based on the two fundamental wave laser lights by introducing the first and second fundamental wave laser lights 1L and 2L thereto, and a resonator 7 having a laser medium 1s of the first fundamental wave light source 1 and the nonlinear optical device 3 disposed in the inside thereof.

In this embodiment, the laser generating apparatus generates a blue coherent light beam having a wavelength $\lambda$SFG as a sum frequency output where the wavelength $\lambda 1$ of the first fundamental wave laser light 1L is 1064 nm and the wavelength $\lambda 2$ of the second fundamental wave laser light L2 is 808 nm.

The resonator 7 is formed as a folded type resonator which comprises two pairs of reflection mirrors, i.e., first to fourth reflection mirrors M1 to M4 as shown in FIG. 2. The folded resonator whose optical path is curved is constructed between the third reflection mirror M3 and the fourth mirror M4.

Between the first and second reflection mirrors M1 and M2 provided within the resonator 7 is disposed a KTP, for example, of the nonlinear optical element 3 of the type 2 in such a fashion as to oppose its light entrance and exit end faces to the first and second reflection mirrors M1 and M2.

The first fundamental wave light source 1 might be an ND:YAG laser, for example. The Nd:YAG of the laser medium 1s of the first fundamental wave light source 1 is disposed between the third and first reflection mirrors M3 and M1, for example. The third reflection mirror M3 serves as an incident surface of the ND:YAG laser medium of the first fundamental wave laser light 1. The first and second mirrors M1,M2 are concave surface mirrors having a curvature radius of 40 mm and the fourth mirror M4 is a plane mirror.

The first to fourth mirrors M1 to M4 are coated with a substance that can reflect the first fundamental wave laser light 1L having the wavelength $\lambda 1$ of 1064 nm with reflectivity as high as about 100%. Further, the mirrors M1 to M4 are coated with a substance that can pass the second fundamental wave laser light 2L having the wavelength $\lambda 2$ emitted from the second fundamental wave light source 2, a light having an excited wavelength of an oscillation wavelength 808 nm, which will be described later, from the exciting laser of the first fundamental wave light source 1 and a light having a sum frequency output wavelength 459 nm with reflectivity as high as about 100%.

In this way, as shown in FIG. 2, the laser light having the second wavelength $\lambda 2$ from the second fundamental wave light source 2 is introduced into the nonlinear optical element 3 through the second reflection mirror M2.

With respect to the laser light having the first wavelength $\lambda 1$, between the third and fourth reflection mirrors M3 and M4 is formed a resonator by an optical path formed by the first mirror M1, the nonlinear optical element 3, the second mirror M2, the fourth mirror M4, the second mirror M2, the nonlinear optical element 3, the first mirror M1, the Nd:YAG laser medium 1s of the first fundamental wave light source 1, the third mirror M3 and the first mirror M1, in that order. A light excited by the excitation laser 11 is supplied through the third mirror M3 to the Nd:YAG laser medium 1s of the first fundamental wave light source 1, whereby the Nd:YAG laser serving as the first fundamental wave light source is oscillated. Also, the generated light having the wavelength $\lambda 1$ of 1064 nm from the first fundamental wave light source 1 is improved in efficiency by a power doubling effect of the resonator.

In this resonator 7, the first and second reflection mirrors M1 and M2 are disposed such that optical axes of the first and second fundamental wave laser lights 1L and 2L incident on these reflection mirrors M1, M2 are not coincident with but are inclined relative to the perpendicular lines of the mirror surfaces thereof.

The laser lights 1L and 2L from the first and second fundamental wave light sources 1 and 2 are adjusted such that their optical axes may be coaxial along the b axis direction of the KTP crystal of the nonlinear optical element 3 in the portion in which the nonlinear optical element 3 is disposed in order to maximize the sum frequency output provided by the nonlinear optical element 3. Further, the two laser lights 1L and 2L are introduced such that polarization planes thereof are extended along the axis a and the axis c of the nonlinear optical element 3, respectively. The nonlinear optical element 3 is disposed such that perpendicular lines of the light entrance and exit end faces thereof are not coincident with but slightly inclined with an inclination angle of about 2° to 3° relative to the optical axes of the first and second fundamental wave laser lights 1L and 2L incident on the same axis. With the above-mentioned arrangements, the phase-matching of the type 2 is carried out in the nonlinear optical element 3.

Although the optical axes of the laser lights are inclined relative to the perpendicular lines of the light entrance and exit end faces of the nonlinear optical element 3, it is sufficient that this inclination angle is set to be about 2° to 3°. There is then no problem that the conversion efficiency is lowered. At that time, the nonlinear optical element 3 is disposed near the focuses of the first and second fundamental wave light sources 1 and 2.

A thickness of the KTP of this nonlinear optical element 3 is selected to be 3.5 mm, for example.

The light entrance and exit end faces of the nonlinear optical element 3 are coated with a substance so that the laser lights of the first and second fundamental wave laser lights and the wavelength of the sum frequency light can be passed substantially in 100%.

The laser medium 1s of the first fundamental wave laser light source 1 is made of a 5 mm-thick 1.1% Nd-doped Nd:YAG. This laser medium 1s is disposed within the resonator 7, and a laser light from the excitation laser 11 disposed outside the resonator is introduced into the laser medium 1s from the third reflection mirror M3 to excite the laser medium 1s.

This excitation laser 11 might be a broad area high output semiconductor laser (maximum output is 1.8 W) having a stripe width of 20 μm. In this case, the excitation laser incorporates therein a temperature control apparatus, such as a Peltier device, and is controlled in temperature so that its oscillation wavelength is set to be 808 nm that is coincident with an absorption ray of Nd:YAG laser.

An output of this excitation semiconductor laser is shaped in beam by a 2.5-times anamorphic prism pair, polarized, synthesized and then coupled to a step index multi-mode fiber 12 having an numerical aperture (NA)=0.35 and a core diameter f 125 μm. An output of the fiber 12 becomes incident on the above-mentioned Nd:YAG laser medium 1s provided within the resonator 7 from an excitation lens 13 having a lateral magnification of three times through the third mirror M3. At that time, an efficiency from the excitation laser output to the excitation lens output was 72% and an excitation power of 2.6 W was obtained.

The second fundamental wave light source 2 should be a lateral single mode light source because a sum frequency output is generated in the coherent process. Further, in order to satisfy the phase-matching condition, the laser must be oscillated at an oscillation wavelength near 808 nm, and a displacement between the oscillated wavelengths must fall within about 4 nm. Although the excitation laser 11 is high in output, this excitation laser 11 is oscillated in the lateral multimode. Therefore, this oscillation laser 11 cannot be used as the second fundamental wave light source which generates a sum frequency output. As the second fundamental wave light source 2 serving as the sum frequency generating light source, there was used an index-guide type AlGaAs semiconductor laser (output is 150 mW) which is oscillated in the lateral single mode. According to the structure in which the nonlinear optical element 3 is disposed with an inclination, the polarization planes of the first and second fundamental wave laser lights are perpendicular to each other. Therefore, by selecting incident angles at which the first and second fundamental wave laser lights are introduced into the nonlinear optical element 3 so as to satisfy Brewster's conditions relative to the nonlinear optical element 3, a reflection of the first fundamental wave laser light on the end face of the nonlinear optical element 3 can be decreased and a sum frequency conversion efficiency in the nonlinear optical element 3 can be increased.

In this case, the incident angles are selected so as to satisfy a relationship expressed as:

$$\tan \theta = n \qquad (2)$$

where $\theta$ represents the incident angle and n represents the refractive index of the nonlinear optical element.

An optical element 14, such as a filter, a Brewster polarizer or the like for absorbing the second fundamental wave laser light or reflecting the same the outside of an optical path is inserted into an optical path through which the second fundamental wave laser light travels after it had passed the nonlinear optical element 3 (i.e., between the first fundamental wave light source 1 and the first reflection mirror M1 in the above-mentioned structure shown in FIG. 2). A reflected-back light to the semiconductor laser of the second fundamental wave light source 2 can be effectively decreased by absorbing or reflecting the second fundamental wave laser light to the outside of the above-mentioned optical path by the optical element 14 disposed as described above. Thus, a noise can be reduced and the laser generating apparatus can be stabilized. Further, the polarization plane of the first fundamental wave laser light from the first fundamental wave light source 1 can be matched with an a-b plane of the crystal of the nonlinear optical element 3 by using the Brewster polarizer as the optical element 14.

A shield member 8 is provided on the outer periphery of the optical path between the resonator 7 and the second fundamental wave light source 2, for example. The shield member 8 serves to shield the reflected light obtained on the basis of a residual reflectivity on the facet of the nonlinear optical element 3 obliquely disposed, the reflection mirror M1 or the like from the second fundamental wave light source 2.

There is then the problem that a reflection scattering generated by respective assembly parts provided within the resonator 7 or an internal scattering excites a high-order spatial mode of the first fundamental wave light source 1, as will be described more fully later on. A shield member 9 that can shield such unnecessary light is provided between the reflection mirrors M2 and M4, for example. These shield members 8 and 9 can be realized by some suitable means, such as slits, apertures, knife edges or the like.

A wavelength selecting element 10 is provided ahead of or behind the semiconductor laser of the second fundamental wave light source 2. An oscillation output intensity of the second wavelength is modulated by introducing a light having a wavelength selected by the wavelength selecting element 10 into the semiconductor laser of the second fundamental wave light source 2, thereby modulating the sum frequency output of the nonlinear optical element 3.

In the embodiment shown in FIG. 2, the second fundamental wave laser light that had passed the nonlinear optical element 3 and the mirror M1 is introduced into a wavelength separating prism 15. The wavelength separating prism 15 has such a feature as to reflect the second fundamental wave laser light with a reflectivity of substantially 100% and to pass the sum frequency output in substantially 100%. A reflected light of the second fundamental wave laser light reflected by the wavelength separating prism 15 is introduced into the wavelength selecting element 10 serving as a diffraction grating, thereby a reflected-back light of the wavelength-selected, i.e., original second fundamental wavelength being obtained. Then, this reflected-back wavelength is introduced again into the wavelength separating light 15 and then returned through the mirror M1, the nonlinear optical element 3 and the mirror M2 to the semiconductor laser of the second fundamental wave light source 2, in which it is modulated.

In this case, a wavelength of a one-order or high-order diffracted light returned in parallel to an incident light by a pitch and an incident angle of the diffraction grating serving as a wavelength selecting element is selected. If a rotary mechanism is provided in the diffraction grating, then an angle of the diffraction grating can be adjusted so as to match with a wavelength of a second fundamental wave light source semiconductor laser by which the sum frequency output is maximized.

At that time, it is preferable that a temperature of the semiconductor laser is adjusted so that a wavelength in which the sum frequency output is maximized becomes the center of the oscillation gain.

According to the laser light source thus arranged, the KTP of the nonlinear optical element 3 was disposed within the resonator 7 having the folded structure, whereby the spot radius of the first fundamental wave laser light at the light incident and emitting facets of the nonlinear optical element 3 could be reduced to about 25 μm. In the case of the conventional structure shown in FIG. 1, the spot radius of the laser light is 35 μm. Therefore, according to the structure of the present invention, the conversion efficiency in the nonlinear optical element 3 is 352/252 as compared with the conventional structure, i.e., an improvement of about twice can be made as compared with the prior art.

Figure 1:
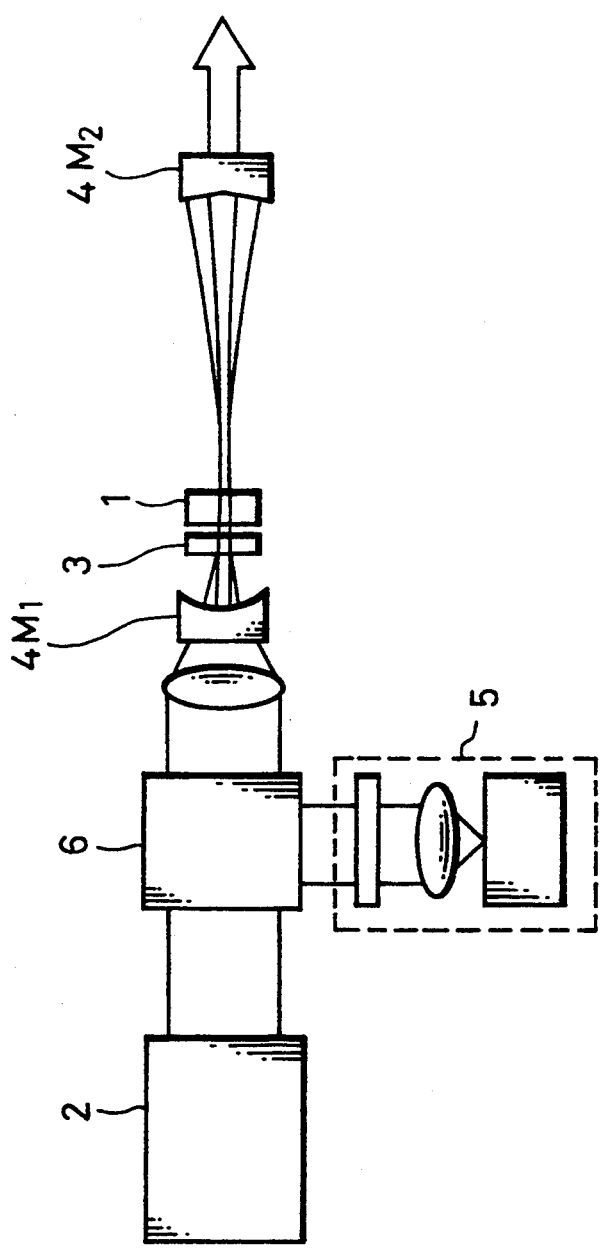
FIG. 1 is a schematic diagram showing a structure of a conventional laser generating apparatus.

In this case, the spot radius of the Nd:YAG laser of the first fundamental wave light source is selected to be about 150 μm which is about three times as large as that of the laser light source of the conventional structure shown in FIG. 1, for example. Therefore, the excited light can be efficiently absorbed by using a broad area type high output semiconductor laser having a stripe width of 50 μm or longer, e.g., 200 μm as the excitation laser 11.

As described above, when a Brewster polarizer is used as the optical element 14, the conversion efficiency can be improved to be about twice by the matching of the polarization plane of the first fundamental wave laser with the above-mentioned a-b plane of the nonlinear optical element 3 as compared with the case that the Brewster polarizer is not used.

Further, according to the above-mentioned structure, the laser generating apparatus can cope with the reflected-back light sufficiently.

The reflected-back light will be described next.

As described above, as the second fundamental wave light source, the index guide type semiconductor laser that oscillates in the single lateral mode generates a high output of 150 mW. Although such semiconductor laser is generally oscillated in the single longitudinal mode, such semiconductor laser is very sensitive to a very small reflected-back light. As a consequence, a large longitudinal mode hopping occurs with the result that the output wavelength becomes unstable. Concurrently therewith, the sum frequency output becomes unstable and the conversion efficiency is deteriorated.

Although the respective reflection mirrors M1 to M4 and the entrance and exit end faces of the nonlinear optical element 3 constituting the resonator 7 are coated with a coating material which passes the second fundamental wave laser light substantially perfectly, as shown by a wavelength dependence of its transmissivity in FIG. 3, it is unavoidable that a residual reflection of about several percents occurs near the wavelength of 800 nm due to an error occurred when a coating material is manufactured. There is then the problem that a reflected-back light occurs due to the reflection at these mirror surfaces and the end faces of the nonlinear optical element.

The reflected-back light will be described below in accordance with three types of the reflected-back light, i.e., a reflected-back light from the resonator, a reflected-back light from the nonlinear optical element and a reflected-back light from the sum frequency generated light.

Figure 5:
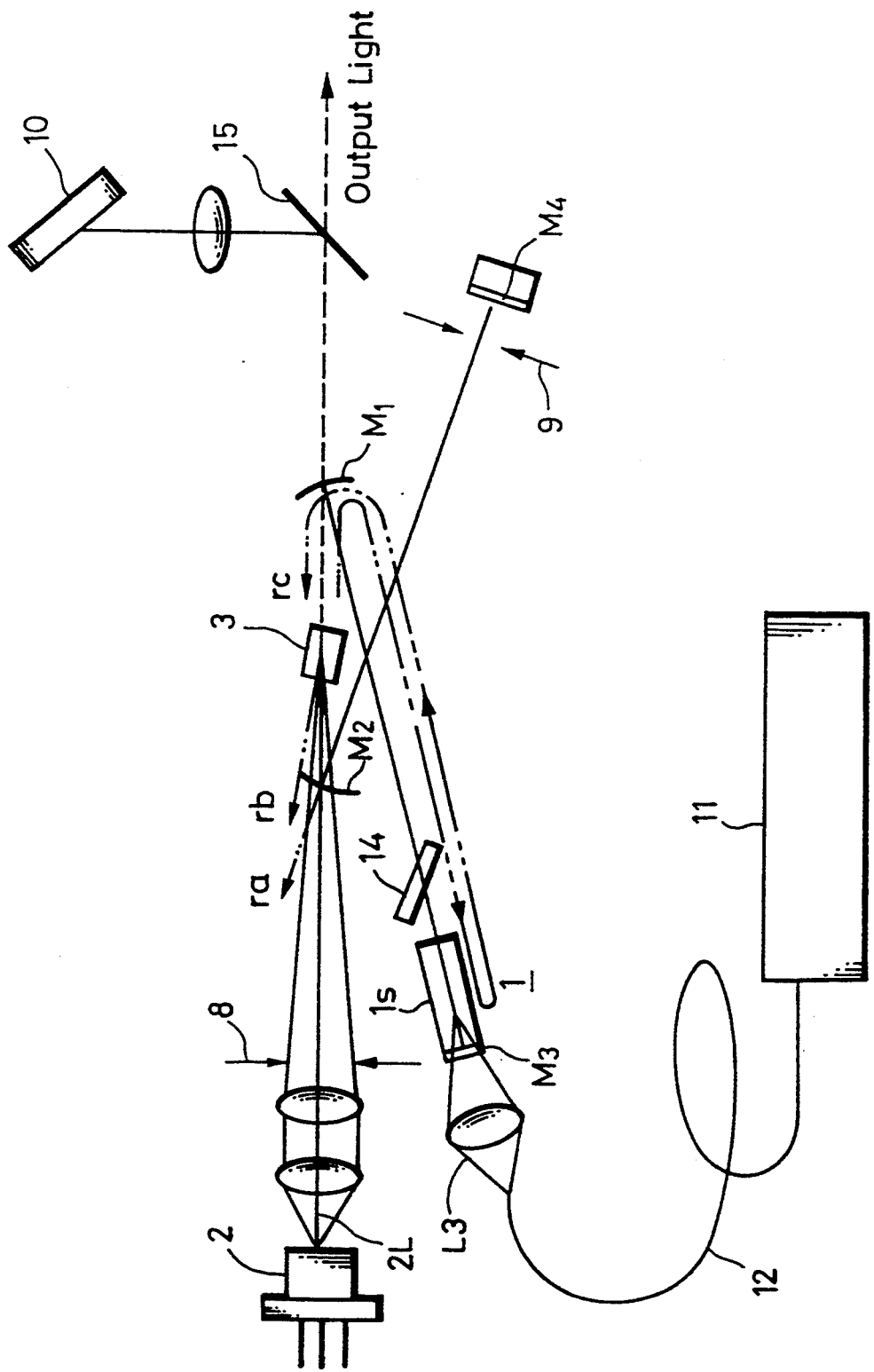
FIGS. 5, 6 and 7 are diagrams of optical paths used to explain the laser generating apparatus according to the present invention.
Figure 6:
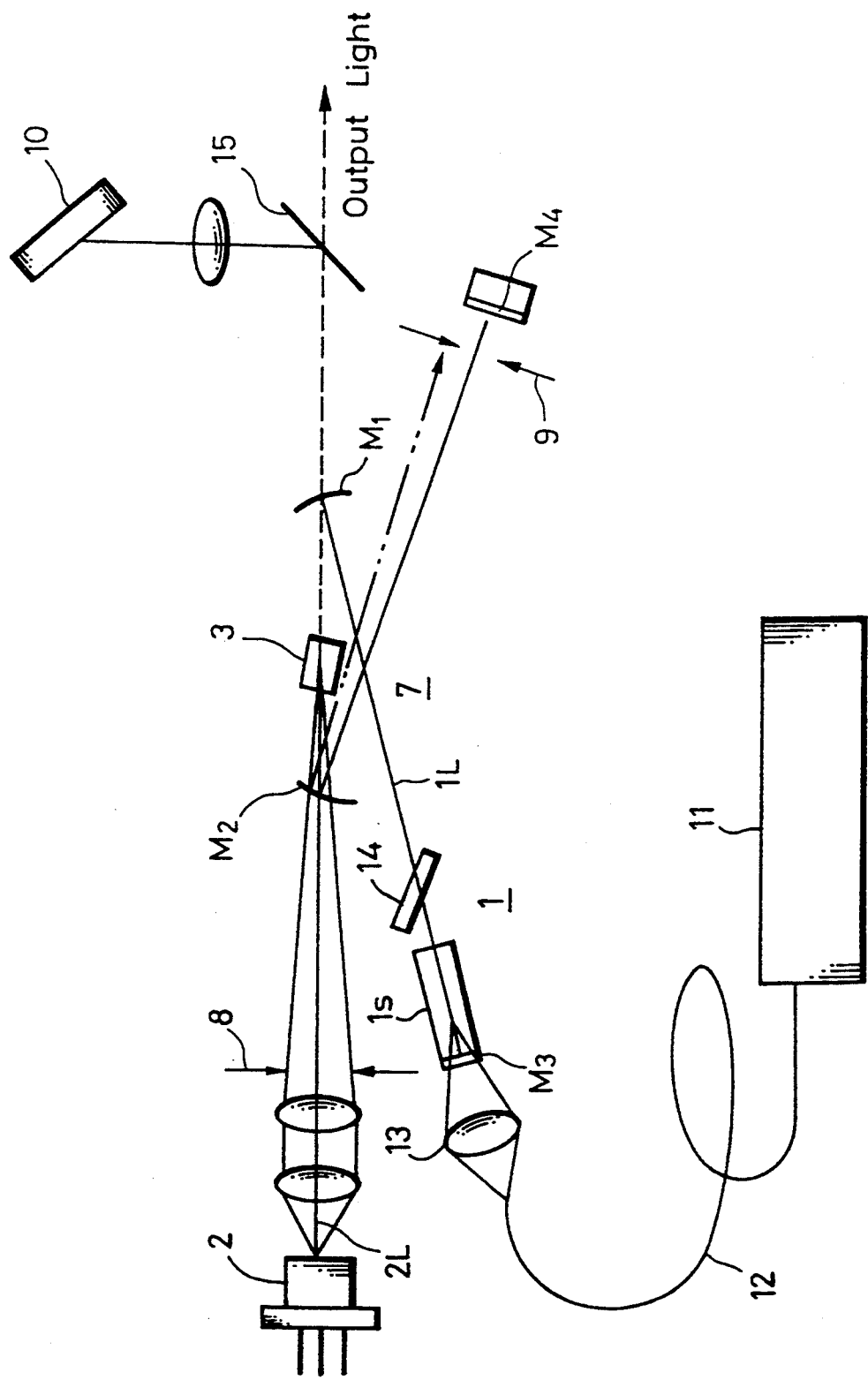

(1-1) A reflected-back light from the resonator:

A dashed line in FIG. 5 shows a reflection optical path in the structure in which an optical axis is inclined relative to the mirror surfaces of the reflection mirrors M1 and M2. Due to the residual reflection of the respective mirrors in the above-mentioned structure, a light that is returned through the reflection mirror M2 travels along an optical axis that is not coincident with an optical axis of a light which becomes incident on the resonator 7 from the second fundamental wave light source 2 as shown by an arrow ra in FIG. 5. Therefore, the reflected-back light can be prevented from being returned to the semiconductor laser of the second fundamental wave light source 2. Further, in order to maximize the sum frequency output, the first and second fundamental wave light sources are disposed on substantially the same axis by adjustment. As a result, as shown by an arrow rc in FIG. 5, after the laser light of the second fundamental wave light source 2 passed the KTP of the nonlinear optical element 3, it travels through an optical path coincident with that of the first fundamental wave laser light which is reflected by about several percents by the reflection mirror M1 due to the residual reflection, reflected by the reflection mirror M3 and then reflected again by the reflection mirror M1, and becomes a reflected-back light returned to the semiconductor laser of the second fundamental wave light source 2. According to the present invention, since the above-mentioned mirror M3 passes the second fundamental wave laser light with a transmissivity of substantially 100%, this reflected-back light can be reduced effectively. More specifically, if the residual reflections of the mirrors M3 and M1 are taken as 5%, then this reflected-back light is reflected three times until it is returned to the semiconductor laser serving as the second fundamental wave light source. Thus, this reflected-back light can be considerably reduced to about (5%) 3, i.e., about 0.01%.

Further, as described above, if the optical element 14 is disposed after the second fundamental wave laser light of the second fundamental wave light source 2 passed the nonlinear optical element 3, then the reflected-back light to the second fundamental wave light source 2 can be reduced.

For example, if a filter that absorbs the second fundamental wave laser light is provided as the optical element 14, then the reflected-back light of the second fundamental wave laser light to the second fundamental wave light source semiconductor laser can be reduced.

If the Brewster polarizer is disposed as this optical element 14, the second fundamental wave laser light is partly reflected by the Brewster polarizer and therefore the reflected-back light can be reduced. The reason for this is that polarized lights of the first and second fundamental wave laser lights are made perpendicular to each other in order that the nonlinear optical element 3 achieves the phase-matching of the type 2.

Furthermore, according to the above-mentioned structure, after having passed through nonlinear optical element 3, the second fundamental wave laser light is reflected by about several percents due to the residual reflection of the mirror M1 and then passes the Nd:YAG laser of the first fundamental wave light source 1. Since this Nd:YAG laser absorbs a part of the semiconductor laser light of the second fundamental wave light source 2 in actual practice, the reflected-back light of the second fundamental wave laser light can be reduced more.

(1-2) A reflected-back light from the nonlinear optical crystal:

Although the light incident and emitting facets of the nonlinear optical element 3 are coated with a coating material which passes the first and second fundamental wave laser lights with a transmissivity of substantially 100%, there occurs the problem of the reflected-back light due to a residual reflection caused by the manufacturing error or the like.

However, according to the present invention, since the first and second fundamental wave laser lights obliquely become incident on the facet of the nonlinear optical element 3, as shown by an arrow rb in FIG. 5, the light from the nonlinear optical element 3 is reflected obliquely. Therefore, the light from the nonlinear optical element 3 can be prevented from being returned to the semiconductor laser of the second fundamental wave light source 2.

At that time, the nonlinear optical element 3 is located near the focal points of the first and second fundamental wave light sources 1 and 2. Accordingly, even when the first and second fundamental laser lights are obliquely introduced into the facet of the nonlinear optical element 3 as described above, there still remains the possibility that the reflected-back light cannot be avoided. More specifically, since the nonlinear optical element 3 is located near a conjugate point of the laser light from the second fundamental wave light source 2, it is frequently observed that the light that was obliquely introduced into the facet of the nonlinear optical element 3 is returned as it is. However, such reflected-back light can be shielded by the above-mentioned shield member 8.

Further, a stray light, such as a reflected light, a scattered light or the like generated from the first fundamental wave light source 1 when such laser light is scattered on the facet of the nonlinear optical element 3, on the surface of the parts within the resonator or internal scattering can be interrupted by the shield member 9. Therefore, the excitation of the high-order spatial mode of the first fundamental wave light source 1 can be avoided. Consequently, the first fundamental wave light source 1 can be stabilized, and a stable sum frequency output can be obtained.

Also, if the incident angle in the nonlinear optical element 3 is selected so as to satisfy Brewster's condition relative to the fundamental wave light source 1, then a reflection of the laser light from the first fundamental wave light source can be reduced more so that a more stable sum frequency output can be obtained.

Figure 7:
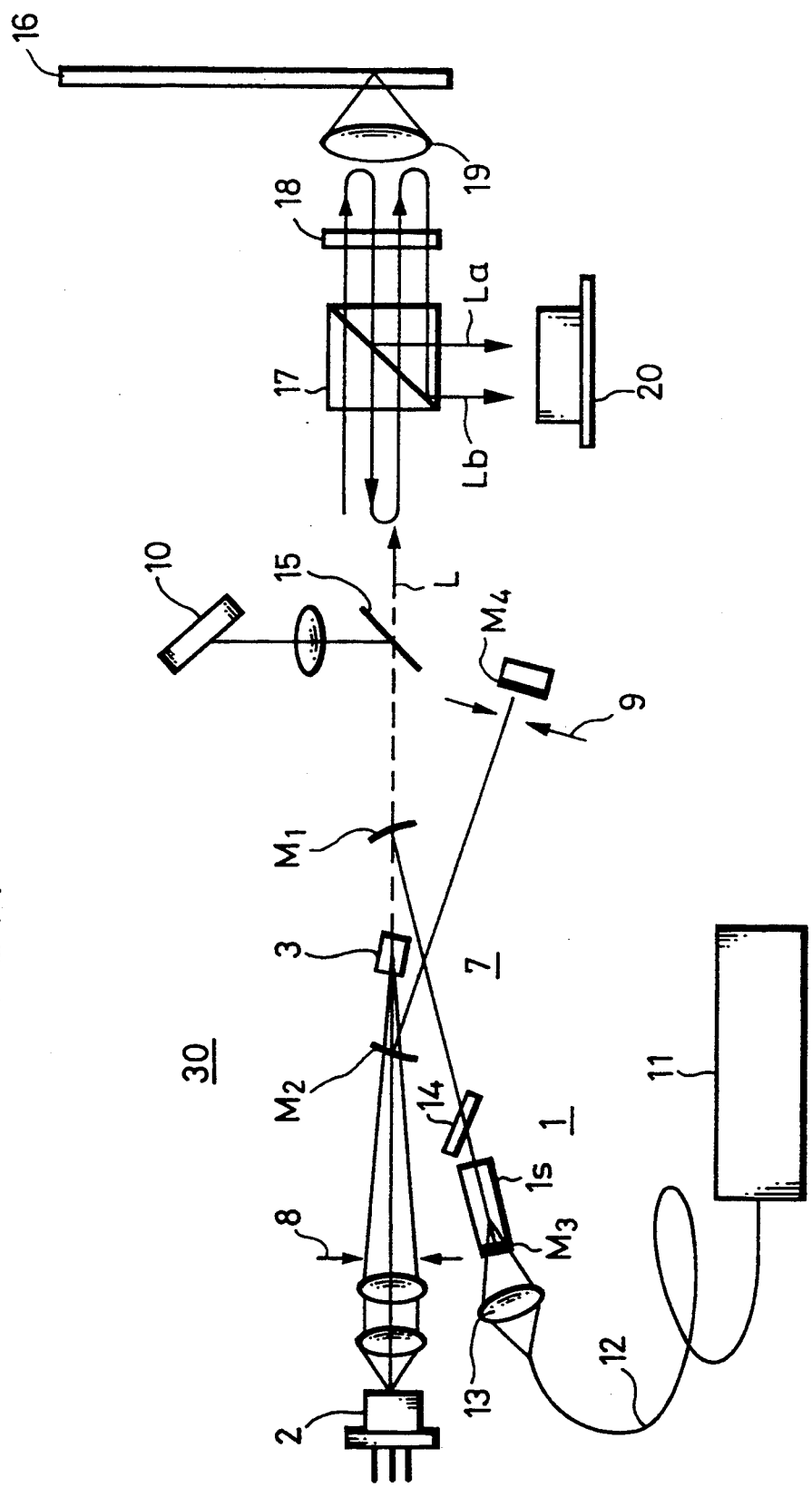
Figure 8:
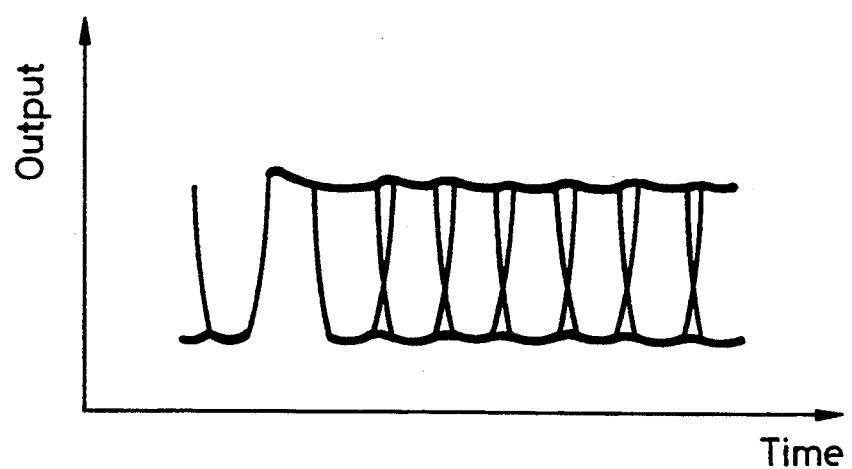
FIG. 8 is an eye-pattern diagram of a sum frequency output of the laser generating apparatus according to the present invention.

(1-3) A reflected-back light of the sum frequency generated light:

As shown in FIG. 7, there is provided a laser light source apparatus 30 according to the present invention.

As shown in FIG. 7, a sum frequency output light L obtained from the laser light source 30 according to the present invention is irradiated on an optical disk 16 through a polarizing beam splitter (PBS) 17, a quarter wave plate 18 and an objective lens 19. A reproducing light which is changed in response to recorded information on the optical disk 16 is diverged via the quarter wave plate 18 and the polarizing beam splitter 17 and then introduced into a detector 20 as shown by an arrow La in FIG. 7, in which it is detected to read out the recorded information.

In this case, a reflected-back light to the light source apparatus 30 can be prevented by a combination of the quarter wave plate 18 and the polarizing beam splitter 17. However, it is unavoidable that a small reflected-back light is generated due to an error produced when assembly parts of the quarter wave plate and the polarizing beam splitter are manufactured and a double refraction produced in a disk substrate when the optical disk is reproduced.

When this sum frequency generated light is returned to the light source apparatus 30, there is then the problem that a residual reflection of about several percents is generated near the wavelength of 460 nm from the surface of the nonlinear optical element 3 or the like. More specifically, if the reflected-back lights from the mirrors of the resonator 7, then the surface of the nonlinear optical element 3 or the like are returned one more time as shown by an arrow Lb, the reflected light Lb and the original sum frequency generated light La cause an interference.

Since an external reflecting object, such as the optical disk or the like, is fluctuated when being rotated, an optical path length is fluctuated in the wavelength order. Accordingly, the phase of the residual reflected light is changed by the rotation of the optical disk or the like so that a noise what might be called an interference noise occurs. A forward intensity I provided when this phase is changed is expressed by the following equation (3):

$$I = |\sqrt{R1} + \sqrt{R2}\, e^{j\delta}|^2 = R1 + 2\sqrt{R1R2}\, \cos\delta + R2 \quad (3)$$

where $\epsilon$ is the phase, R1 is the reflected-back ratio and R2 is the residual reflectivity.

Amplitudes of the intensity fluctuation provided when the reflection phase $\epsilon$ is changed from 0 to $\pi$ relative to several values of R are illustrated on the following table 1:

TABLE 1

| reflected-back ratio | residual reflectivity R2 | amplitude 2 of intensity fluctuation R1 R2 |
| --- | --- | --- |
| 5% | 5% | 10% |
| 5% | 1% | 4.5% |
| 5% | 0.1% | 1.4% |
| 5% | 0.01% | 0.45% |

Even when the reflected-back ratio is 5% and the residual reflectivity is 5%, an intensity fluctuation of ±10% occurs. In order to suppress the fluctuation to 1% so that the semiconductor laser becomes stable in actual practice, a reflectivity of the reflected light must fall within 0.01%. This reflectivity cannot be substantially achieved by the mirrors of the resonator having the transmissivity characteristic shown in FIG. 4.

On the other hand, if the resonator is formed of a plurality of mirrors having high transmissivity relative to the sum frequency output light and the laser light is arranged so as to become incident on the respective mirrors M1 and M2 and the nonlinear optical element 3 as in the structure of the present invention, then the reflectivity of the reflected light of the sum frequency light can be decreased considerably. In the example of the structure according to the present invention, the laser light is reflected on the mirrors three times in total similarly as shown by the arrow rc in FIG. 5 until the reflected-back light of the sum frequency light is reflected and then returned forwardly. Accordingly, even with the reflectivity of 5% per one plane, the effective reflected light reflectivity R can be suppressed to about 0.01% whose interference is negligible. In other words, although it is impossible to reduce the reflectivity less than 0.01% by one reflection, the reflectivity can be lowered by the increase of the mirrors. Accordingly, it is needless to say that the number of the mirrors can be arbitrarily. This is also true for the reflected-back light from the nonlinear optical crystal.

Incidentally, although the surface of the nonlinear optical element 3 is coated with a coating material so that the sum frequency light can be passed through the surface of the nonlinear optical element 3 substantially perfectly, the residual reflection occurs due to the error occurred in the manufacturing process. There then remains the problem of the aforementioned reflected-back light. On the other hand, according to the structure of the present invention shown in FIG. 2, the sum frequency light is emitted with an inclination relative to the perpendicular line of the surface of the nonlinear optical element 3.

Similarly as described above, the reflected-back light from the surface of the nonlinear optical element 3 is reflected obliquely and does not overlap with the original sum frequency with the result that no interference noise is produced. Further, since the nonlinear optical element 3 is located near the focal point of the sum frequency light, there is then the possibility that the interference noise cannot be prevented by the oblique reflected-back light.

More specifically, since the nonlinear optical element 3 is located near the conjugate point of the sum frequency light, it is frequency observed that the oblique incident light is returned as it is. Such reflected-back light can be shielded by the existence of the shield member 8 shown in FIG. 2.

As described above, according to the structure of the present invention, it is possible to obtain a stable sum frequency output.

A modulation characteristic will be considered next.

As earlier noted in the pre-amble, in the conventional structure of FIG. 2, there had been reported so far a direct high speed modulation of the sum frequency output by the semiconductor laser of the second fundamental wave light source. In this case, only the repetition of the single signal was reported.

A recording of the optical memory or the like is required to modulate the random recording pattern. When the laser generating apparatus is used as a light source for this case, if the intensity in this semiconductor laser is simply modulated in the conventional structure shown in FIG. 1, then a mode hopping of the semiconductor laser remarkably appears in modulation. As a result, the decrease of the modulated output and the distortion of the waveform were observed.

Figure 9A:
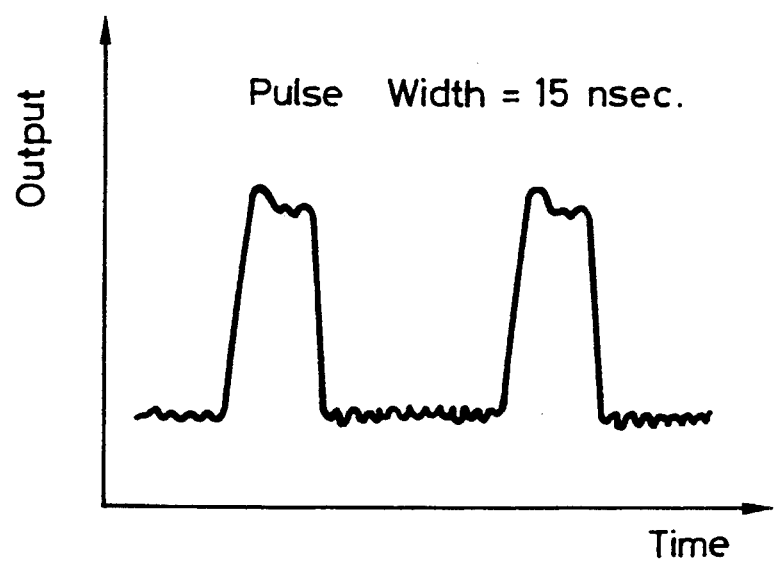
FIGS. 9A and 9B are diagrams showing waveforms of outputs from the conventional laser generating apparatus.
Figure 9B:
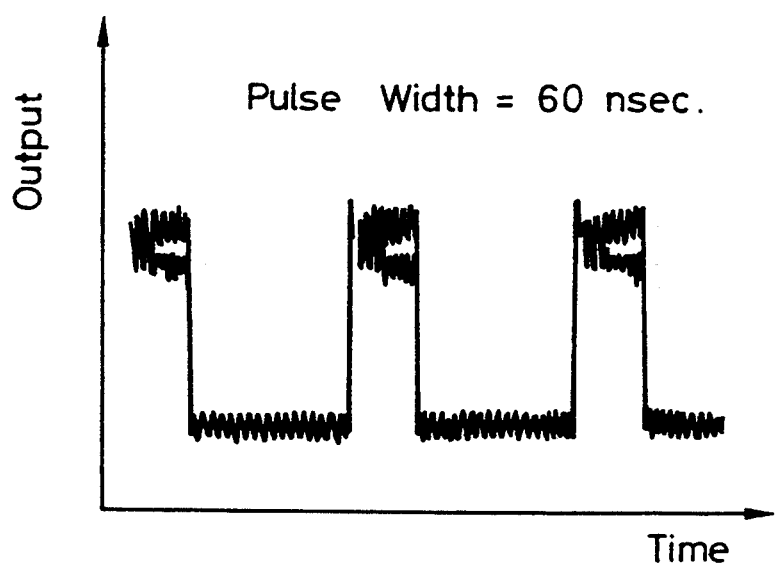
Figure 10A:
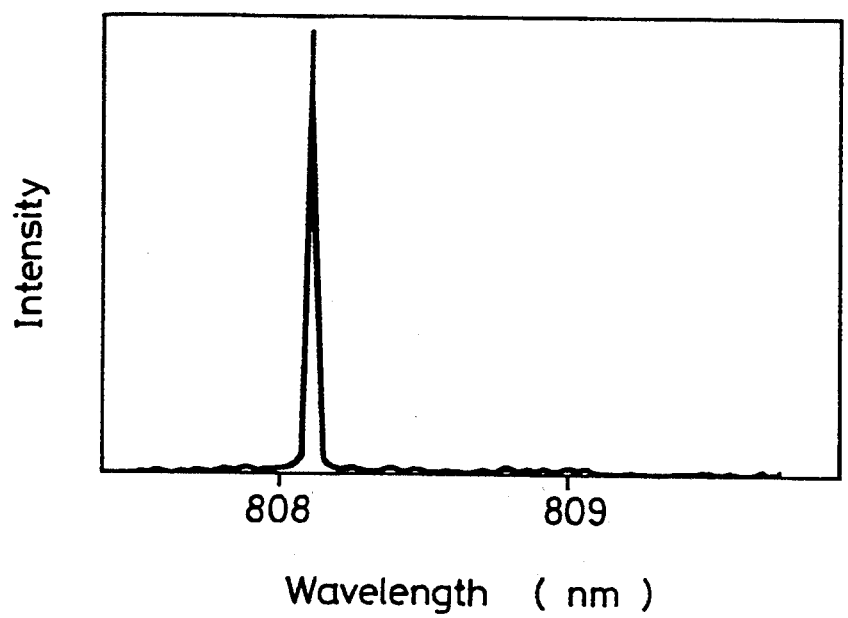
FIGS. 10A and 10B are diagrams showing spectrums of outputs from the conventional laser generating apparatus.
Figure 10B:
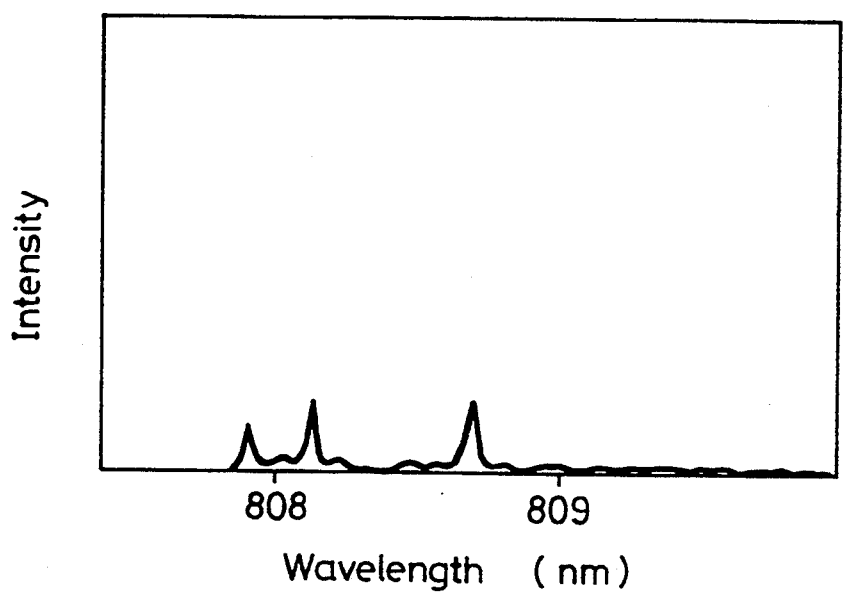
Figure 11:
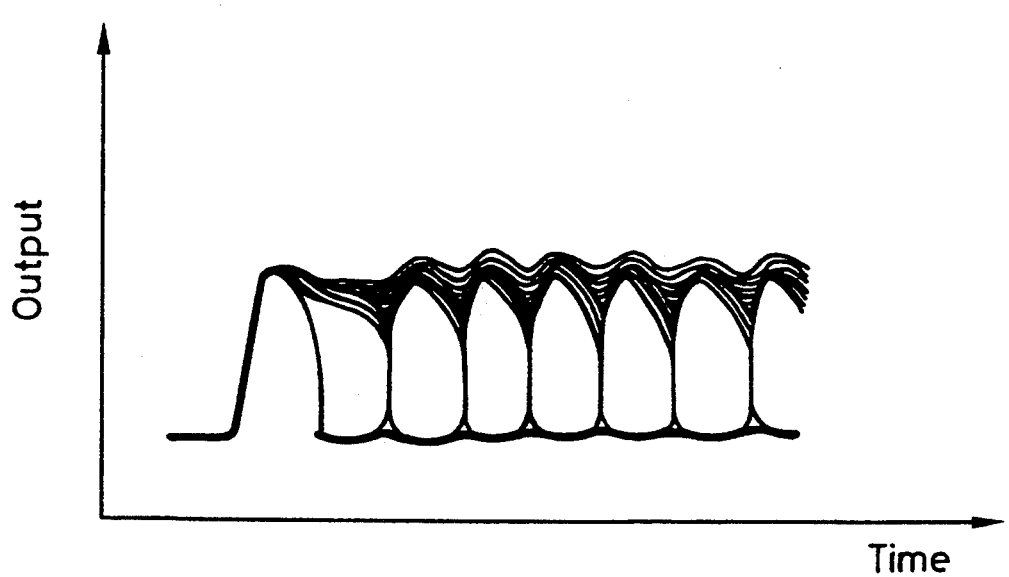
FIG. 11 is an eye-pattern diagram of a sum frequency output from the conventional laser generating apparatus.

In this case, when the intensity of the semiconductor laser is modulated by using a pulse having a short pulse width of about 15 nsec, there could be obtained a satisfactory modulated waveform shown in FIG. 9A. At that time, the oscillation spectrum of the semiconductor laser was a longitudinal single mode as shown in FIG. 10A. If the pulse width is extended as 60 nsec, as shown in FIG. 9B, a waveform was distorted and the oscillation spectrum of the semiconductor laser at that time became a longitudinal multi-mode as shown in FIG. 10B. Furthermore, if the intensity of the semiconductor laser is modulated by a random signa of 50 Mbits/second, there is then the problem that s waveform is distorted as shown by an eye pattern in FIG. 11. The random signal has short and long pulses mixed therein so that, in the case of the long pulse, the oscillation mode becomes the longitudinal multi-mode, thereby deteriorating the signal.

Incidentally, when the second fundamental wave light source 2 is the semiconductor laser, if the wavelength selection element is provided ahead of or behind the semiconductor laser and a reflected light is returned to the semiconductor laser, then the longitudinal mode of the semiconductor laser is stabilized. Accordingly, even when the output intensity of the semiconductor laser is modulated, the wavelength is not fluctuated and the longitudinal single mode is maintained. At that time, it can be expected that the sum frequency generated light can obtain a satisfactory modulated waveform having no distortion.

However, according to the structure shown in FIG. 1, residual reflections are caused by the mirrors of the resonator and the nonlinear optical element so that, when the phases of the reflected-back lights from these surfaces are fluctuated, the reflected-back lights conflict with the reflected lights from the wavelength selecting element so that the output wavelength of the semiconductor laser becomes unstable. As a result, a sum frequency modulated output becomes unstable.

Conversely, according to the structure of the present invention, it is possible to remove the residual reflections produced from the mirrors of the resonator, the nonlinear optical element or the like. More specifically, as shown in FIG. 2, the second fundamental wave laser light that had passed through the nonlinear optical element 3 and the mirror M1 is introduced into the wavelength separating prism. The wavelength separating prism has such characteristics as to reflect the second fundamental wave laser light with a reflectivity of substantially 100% and to pass therethrough the sum frequency output with a transmissivity of substantially 100%. By introducing the second fundamental wave laser reflected light reflected by the wavelength separating prism into the diffraction grating that is the wavelength selecting element 10, it is possible to obtain a reflected-back light whose wavelength is selected, i.e., having the second fundamental wave wavelength to the semiconductor laser of the second fundamental wave light source. The longitudinal mode of the semiconductor laser of the fundamental wave light source is stabilized by this reflected-back light so that, even when the output intensity is modulated, the wavelength is prevented from being fluctuated, thereby keeping the longitudinal mode. In actual practice, if the output intensity was modulated by a random signal of 50 Mbits/second according to the above-mentioned system, then there could be obtained a modulated waveform of a satisfactory sum frequency generated light having no distortion as shown in FIG. 7.

While the diffraction grating is disposed ahead of the semiconductor laser of the second fundamental wave light source in the example of FIG. 2, the present invention is not limited thereto and a wavelength selecting element may be provided for a light generated from the rear portion of the semiconductor laser.

While the diffraction grating is used as the wavelength selecting element 10 as described above, the present invention is not limited thereto and other elements which can select wavelengths, such as a dispersing prism, an Ethalon, an interference filter and a double refraction filter.

Further, while the semiconductor laser and the diffraction grating are constructed separately in the example of FIG. 2 as described above, the present invention is not limited thereto and the semiconductor laser and the diffraction grating may be formed as a DFB (distributed feedback) type and a DBR (distributed Bragg reflection) type in which the diffraction grating and the semiconductor laser are integrally formed with each other.

According to the conventional structure shown in FIG. 1, there is the problem that an output from the DFB type laser diode or the DBR type semiconductor laser becomes unstable due to the residual reflection from the nonlinear optical element KTP or the like. The problem of the residual reflection is solved by the structure shown in FIG. 2 so that the DFB type laser diode and the DBR type semiconductor laser can be employed.

While the output from the semiconductor laser from the second fundamental wave light source 2 is directly introduced into the KTP of the nonlinear optical element 3 in the example of FIG. 2 as described above, the output from the semiconductor laser is limited and therefore the sum frequency output also is limited. Furthermore, in order to obtain the sum frequency light of high output, the output from the semiconductor laser is amplified by an optical amplifier and then introduced into the nonlinear optical element 3.

As the above optical amplifying means, there can be used a semiconductor diode amplifier of a broad area type nd a MOPA (master oscillator power amplifier) in which the optical amplifier is formed to be integral with a semiconductor laser.

If there is a residual reflection similarly as described above, even this system cannot remove the problem. However, the above-mentioned structure solves the problem of the residual reflection so that the above-mentioned optical amplifier can be used.

Figures 3A, 3B:
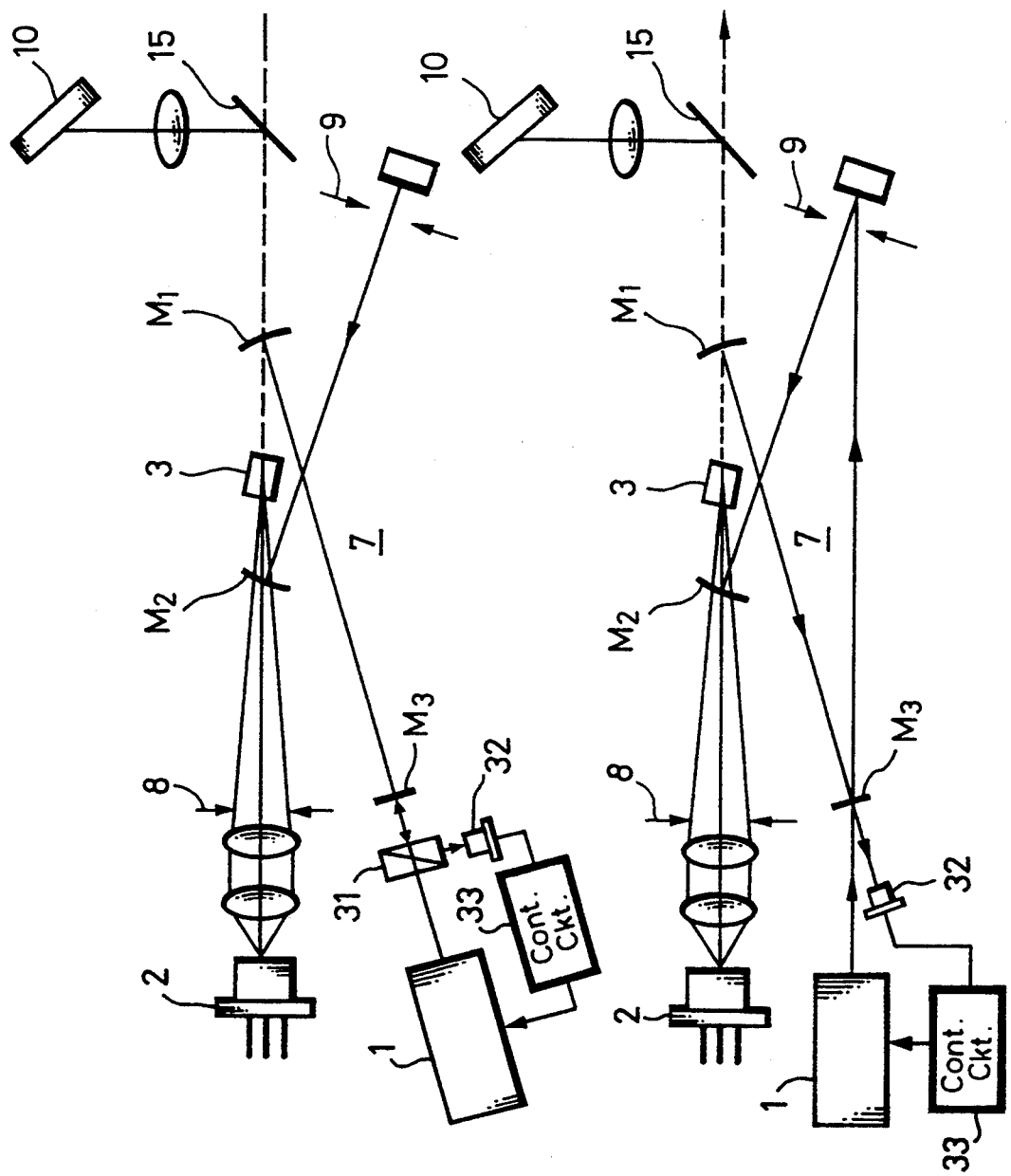
FIGS. 3A and 3B are schematic diagrams showing structures of examples of external resonators used in the laser generating apparatus according to the present invention, respectively.

Further, in the example shown in FIG. 2, according to a first aspect of the present invention, there is provided the fundamental structure of so-called internal resonator in which the laser medium 1s of the first fundamental wave light source 1, i.e., Nd:YAG laser 1s is disposed within the resonator 7. However, as shown in FIG. 3A or 3B, according to a second aspect of the present invention, there is provided the fundamental structure of an external resonator structure. Also in this case, similarly to the case of FIG. 2, it is possible to improve the conversion efficiency and the problem of the reflected-back light.

In FIGS. 3A and 3B, like parts corresponding to those of FIG. 2 are marked with the same references and therefore need not be described in detail. In this example, the Nd:YAG laser 1s is disposed outside the resonator 7 as the first fundamental wave light source 1. FIG. 3A shows the example that the resonator is formed as a so-called standing wave type. As shown in FIG. 3A, a part of reflected-back light from the resonator 7 through the beam splitter 31 is converted into an electrical signal by a photo-detector 32. An electrical signal output from the photo-detector 32 is introduced into a control circuit 33, whereby the laser oscillation wavelength is made coincident with the resonance wavelength by effecting the laser control.

FIG. 3B shows the case that the resonator is formed as a ring-type resonator. In FIG, 3B, like parts corresponding to those of FIG. 3A are marked with the same references and therefore need not be described.

Having described preferred embodiment of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A laser generating apparatus comprising:
   a first fundamental wave light source for generating a first fundamental wave laser light having a first wavelength;
   a second fundamental wave light source for generating a second fundamental wave laser light different from said first wavelength;
   a nonlinear optical element for generating a sum frequency light having a wavelength of sums of wavelengths of said first and second fundamental wave laser lights; and
   a resonator having a laser medium of said first fundamental wave light source and said nonlinear optical element disposed therein;
   said resonator having first and second reflection mirrors which are disposed in an opposing relation to each other on at least opposing entrance and exit end faces of said nonlinear optical element;
   said first and second reflection mirrors having transmissivities as high as possible relative to said second fundamental wave laser light and said sum frequency light and having a reflectivity as high as possible relative to said first fundamental wave laser light, wherein incident optical axes of said first and second fundamental wave laser lights relative to mirror surfaces of said first and second reflection mirrors are selected to be held in the oblique directions having predetermined angles that are not coincident with perpendicular lines of said mirror surfaces.

2. A laser generating apparatus according to claim 1, wherein said resonator is formed of two pairs of reflection mirrors or more and whose optical path has a folded arrangement.

3. A laser generating apparatus according to claim 1, wherein optical axes of said first and second fundamental wave laser lights introduced into said nonlinear optical element are selected to be held in the oblique directions having predetermined angles that are not coincident with perpendicular lines of entrance and exit end faces of said nonlinear optical element.

4. A laser generating apparatus according to claim 3, wherein incident angles of said first and second fundamental wave laser lights introduced into said nonlinear optical element are selected to be an incident angle that satisfies Brewster's condition relative to said nonlinear optical element.

5. A laser generating apparatus according to claim 1, wherein said resonator has on its optical path of said second fundamental wave laser light passed through said nonlinear optical element inserted an optical element which absorbs or reflects said second fundamental wave laser light to the outside of said optical path.

6. A laser generating apparatus according to claim 3, further comprising shield members for shielding said second fundamental wave light source from reflected lights from said entrance and exit end faces of said nonlinear optical element and from the reflection mirror surfaces of said resonator.

7. A laser generating apparatus according to claim 3, further comprising a shield plate member for shielding said first fundamental wave light source which excites a high-order spatial mode of said first fundamental wave light source a reflected and scattered light produced on the surface of assembly parts disposed within said resonator and an internal scattering.

8. A laser generating apparatus according to claim 1, wherein said second fundamental wave light source is formed of a semiconductor laser and a wavelength selecting element is disposed ahead of or behind said semiconductor laser, whereby a light having a wavelength selected by said wavelength selecting element is introduced into said semiconductor laser of said second fundamental wave light source in which an output of said sum frequency light of said nonlinear optical element is modulated by modulating an oscillation output intensity of said second wavelength.

9. A laser generating apparatus according to claim 8, wherein said wavelength selecting element is formed of a diffraction grating.

10. A laser generating apparatus comprising:
a first fundamental wave light source for generating a first fundamental wave laser light of a first wavelength;
a second fundamental wave light source for generating a second fundamental wave laser light having a second wavelength different from that of said first wavelength;
a nonlinear optical element for generating a sum frequency light having wavelengths of said first and second fundamental wave laser lights by introducing said first and second fundamental wave laser lights thereto; and
a resonator having said nonlinear optical element disposed therein;
said resonator having first and second reflection mirrors disposed on opposing entrance and exit end faces of at least said nonlinear optical element in an opposing relation;
said first and second reflection mirrors having transmissivities as high as possible relative to said second fundamental wave laser light and said sum frequency light and reflectivities as high as possible relative to said first fundamental wave laser light, wherein incident optical axes of said first and second fundamental wave laser lights relative to said mirror surfaces of said first and second reflection mirrors are selected to be held in oblique directions having predetermined angles that are not coincident with perpendicular lines of said mirror surfaces of said first and second reflection mirrors.

11. A laser generating apparatus according to claim 10, wherein said resonator is formed of two pairs of reflection mirrors or more and whose light path has a folded arrangement.

12. A laser generating apparatus according to claim 10, wherein optical axes of said first and second fundamental wave laser lights introduced into said nonlinear optical element are selected to be held on oblique directions having predetermined angles that are not coincident with perpendicular lines of entrance and exit end faces of said nonlinear optical element.

13. A laser generating apparatus according to claim 12, wherein incident angles of said first and second fundamental wave laser lights introduced into said nonlinear optical element are selected to be incident angles that satisfy Brewster's condition relative to said nonlinear optical element.

14. A laser generating apparatus according to claim 10, wherein said resonator has on its optical path of said second fundamental wave laser light passed through said nonlinear optical element inserted an optical element which absorbs or reflects said second fundamental wave laser light to the outside of said optical path.

15. A laser generating apparatus according to claim 12, further comprising shield members for shielding said second fundamental wave light source from reflected lights from said entrance and exit end faces of said nonlinear optical element and said reflection mirror surfaces of said resonator.

16. A laser generating apparatus according to claim 12, further comprising a shield plate member for shielding said first fundamental wave light source which excites a high-order spatial mode of said first fundamental wave light source from reflected and scattered lights produced on the surface of assembly parts provided within said resonator and an internal scattering.

17. A laser generating apparatus according to claim 10, wherein said second fundamental wave light source is formed of a semiconductor laser and a wavelength selecting element is disposed ahead of or behind said semiconductor laser, whereby an output of a sum frequency light of said nonlinear optical element is modulated by introducing the light having the wavelength selected by said wavelength selecting element into said semiconductor laser of said second fundamental wave light source.

18. A laser generating apparatus according to claim 17, wherein said wavelength selecting element is formed of a diffraction grating.

* * * * *